(12) United States Patent
Biebuyck et al.

(10) Patent No.: US 9,497,904 B2
(45) Date of Patent: Nov. 22, 2016

(54) PLUNGER SLOT COVER ASSEMBLY FOR AN AGRICULTURAL BALER

(71) Applicant: CNH Industrial America LLC, New Holland, PA (US)

(72) Inventors: Ronald Biebuyck, Veurne (BE); Frederik Demon, Bruges (BE); Karel Naeyaert, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/755,718

(22) Filed: Jun. 30, 2015

(65) Prior Publication Data

US 2016/0000011 A1 Jan. 7, 2016

(30) Foreign Application Priority Data

Jul. 3, 2014 (BE) .................................. 2014/0511

(51) Int. Cl.
*A01F 15/04* (2006.01)
*B30B 9/30* (2006.01)

(52) U.S. Cl.
CPC ........... *A01F 15/042* (2013.01); *B30B 9/3021* (2013.01)

(58) Field of Classification Search
CPC .... A01F 15/04; A01F 15/042; A01F 15/101; A01F 15/10; A01F 2015/102; B30B 9/3021
USPC ............ 100/179, 188 R, 189, 240, 241, 245; 56/432
See application file for complete search history.

(56) References Cited

U.S. PATENT DOCUMENTS

| | | | | | |
|---|---|---|---|---|---|
| 3,059,569 | A | * | 10/1962 | Nolt | A01F 15/04 100/179 |
| 3,249,040 | A | * | 5/1966 | Van Der Lely | A01F 15/04 100/179 |
| 4,172,414 | A | * | 10/1979 | Klinner | A01F 15/02 100/100 |

FOREIGN PATENT DOCUMENTS

| | | | | |
|---|---|---|---|---|
| DE | 4032393 A1 | * | 5/1991 | ............ A01F 15/04 |
| DE | 288309 B5 | | 6/1995 | |
| DE | 20314460 U1 | | 1/2004 | |
| GB | 773068 A | | 4/1957 | |
| GB | 2145968 A | | 4/1985 | |

* cited by examiner

*Primary Examiner* — Jimmy T Nguyen
(74) *Attorney, Agent, or Firm* — Partick M. Sheldrake

(57) ABSTRACT

An agricultural baler includes a main bale chamber having a pair of opposed side walls, with each said side wall including a plunger slot arrangement defining a plunger slot. A pair of plunger slot rails are positioned in each plunger slot, including a top rail positioned at a top of a respective plunger slot and a bottom rail positioned at a bottom of a respective plunger slot. A plunger is reciprocally disposed within the main bale chamber. The plunger includes a pair of opposed sides and at least one roller extending laterally outward from each side, with each roller being positioned within a respective plunger slot. The baler is characterized by a pair of plunger slot cover assemblies, with each cover assembly being associated with a respective plunger slot and having an upper cover and a lower cover.

14 Claims, 6 Drawing Sheets

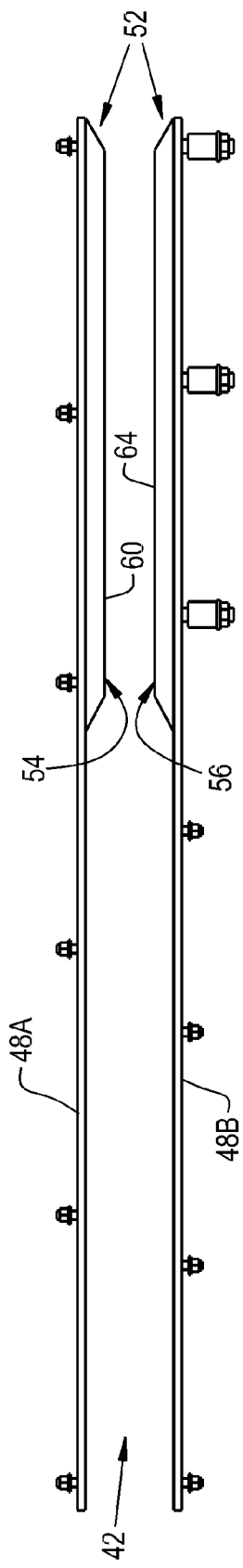
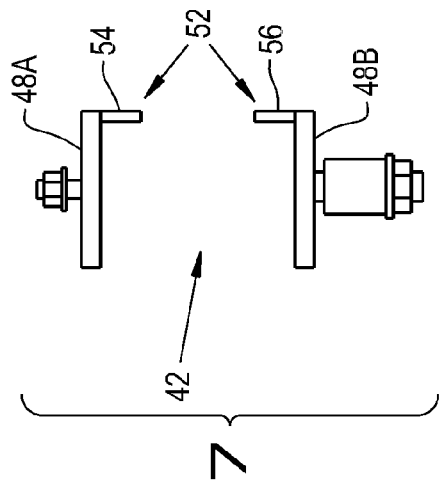

PLUNGER SLOT COVER ASSEMBLY FOR AN AGRICULTURAL BALER

BACKGROUND OF THE INVENTION

This application claims foreign priority under 35 U.S.C. §119 to Belgian Application BE2014/0511 filed Jul. 3, 2014 titled "PLUNGER SLOT COVER ASSEMBLY FOR AN AGRICULTURAL BALER" and having Ronald Biebuyck, Frederik Demon and Karel Naeyaert as the inventors. The full disclosure of BE2014/0511 is hereby incorporated herein by reference.

1. Field of the Invention

The present invention relates to agricultural balers, and, more particularly, to bale chambers within such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes snuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During the bale formation within the bale chamber, as described above, crop material can be forced through the plunger slots on opposite sides of the bale chamber. The crop material can accumulate outside of the bale chamber, such as in an area around the axle, or in an area between the twine box and the frame. It is thus necessary for the operator to periodically dismount from the traction unit and clean the crop from the baler. This takes time and effort on the part of the operator, reducing the baling efficiency of the baler.

German patent document DD 288 309 B5 discloses a baler with a plunger slot arrangement having a panel that carries an upper guide rail and lower guide rail. Plunger rollers run between the guide rails. The panel provides the structural framework for the plunger slot arrangement, and appears to be formed as an extrusion which is closed on the side opposite from the plunger. Since the panel provides the structural support for the plunger slot arrangement, and also appears to be formed as an extrusion, the outside closed wall apparently extends the full length of the plunger slot arrangement. Crop material would tend to accumulate within the plunger slot, which in turn could negatively affect the reciprocating movement of the plunger rollers within the plunger slot.

What is needed in the art is an agricultural baler which avoids problems of crop accumulation in the plunger slot and areas outside of the bale chamber.

SUMMARY OF THE INVENTION

The present invention provides an agricultural baler with a plunger slot cover assembly for each plunger slot having a pair of plates positioned at the laterally inward edge of the plunger slot rails, such that the plates are positioned between the plunger and plunger slot rollers.

The invention in one form is directed to an agricultural baler including a main bale chamber having a pair of opposed side walls, with each said side wall including a plunger slot arrangement defining a plunger slot. A pair of plunger slot rails are positioned in each plunger slot, including a top rail positioned at a top of a respective plunger slot and a bottom rail positioned at a bottom of a respective plunger slot. A plunger is reciprocally disposed within the main bale chamber. The plunger includes a pair of opposed sides and at least one roller extending laterally outward from each side, with each roller being positioned within a respective plunger slot. The baler is characterized by a pair of plunger slot cover assemblies, with each cover assembly being associated with a respective plunger slot and having an upper cover and a lower cover. The upper cover extends downward from the top rail and has a lower edge positioned between at least one respective roller and the plunger when the plunger is at a forward position. The lower cover extends upward from the bottom rail and has an upper edge positioned between at least one respective roller and the plunger when the plunger is at the forward position.

An advantage of the present invention is that crop material is inhibited from entering the plunger slot.

Another advantages is that crop material is inhibited from passing through the plunger slot and accumulating on the baler in an area outside of the main bale chamber.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 is a side view of the plunger slot rails and associated covers; and

FIG. 7 is an end view of the plunger slot rails and covers, as viewed from the right side of FIG. 6.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
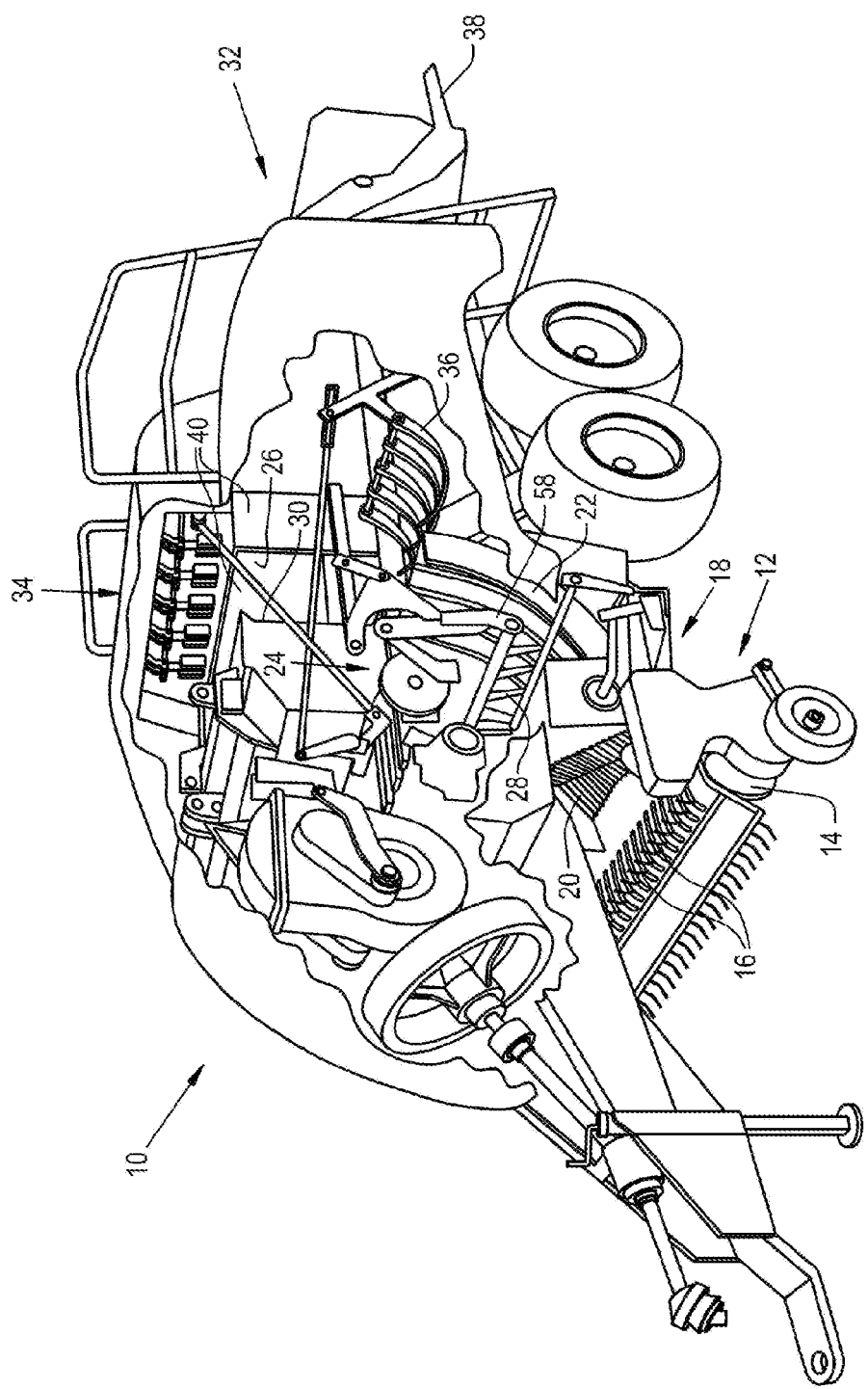
FIG. 1 is a perspective cutaway view showing the internal workings of a large square baler, which may include a main bale chamber with a plunger slot arrangement of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Referring now to FIGS. 1-4, conjunctively, the main bale chamber 26 includes a pair of side walls 40, with each side wall 40 having a plunger slot 42 therein. Each plunger slot 42 has a longitudinal extension in the directions of reciprocating movement of the plunger 30, and supports the plunger 30 during the plunger strokes within the main bale chamber 26. Each plunger slot 42 is sized and configured to receive one or more rollers 44 which extend laterally from each side 46 of the plunger 30. In the embodiment shown, a pair of substantially parallel plunger slot rails 48 are attached to the side walls 40 and define the plunger slot 42. Each pair of plunger slot rails 48 includes a top rail 48A and a bottom rail 48B. The plunger 30 is shown with a pair of forward rollers 44A and a pair of rearward rollers 44B, which travel within a corresponding plunger slot 42; however, the number of rollers 44 extending from each side 46 can vary. Further, the plunger 30 can have an additional roller 50 extending from each side 46 which rotates about a vertical axis and engages a bottom rail 48B and/or top rail 48A to limit side to side movement of the plunger 30 during compression strokes.

According to an aspect of the present invention, and referring now to FIGS. 2-5, each plunger slot 42 is partially covered with a plunger slot cover assembly 52 in a manner which inhibits crop from accumulating within the plunger slot 42, and also inhibits the crop material from passing through the plunger slot 42 and exiting to the outside of the main bale chamber 26.

Each plunger slot cover assembly 52 includes an upper cover 54 and a lower cover 56. The upper cover 54 is connected to and extends downward from a laterally inside edge 58 of the top rail 48A. The upper cover 54 has a lower edge 60 which is positioned between at least one roller 44 and the plunger 30 when the plunger 30 is at the forward position. Likewise, the lower cover 56 is connected to and extends upward from a laterally inside edge 62 of the bottom rail 48B. The lower cover 56 has an upper edge 64 which is positioned between at least one roller 44 and the plunger 30 when the plunger 30 is at the forward position.

Figure 2:
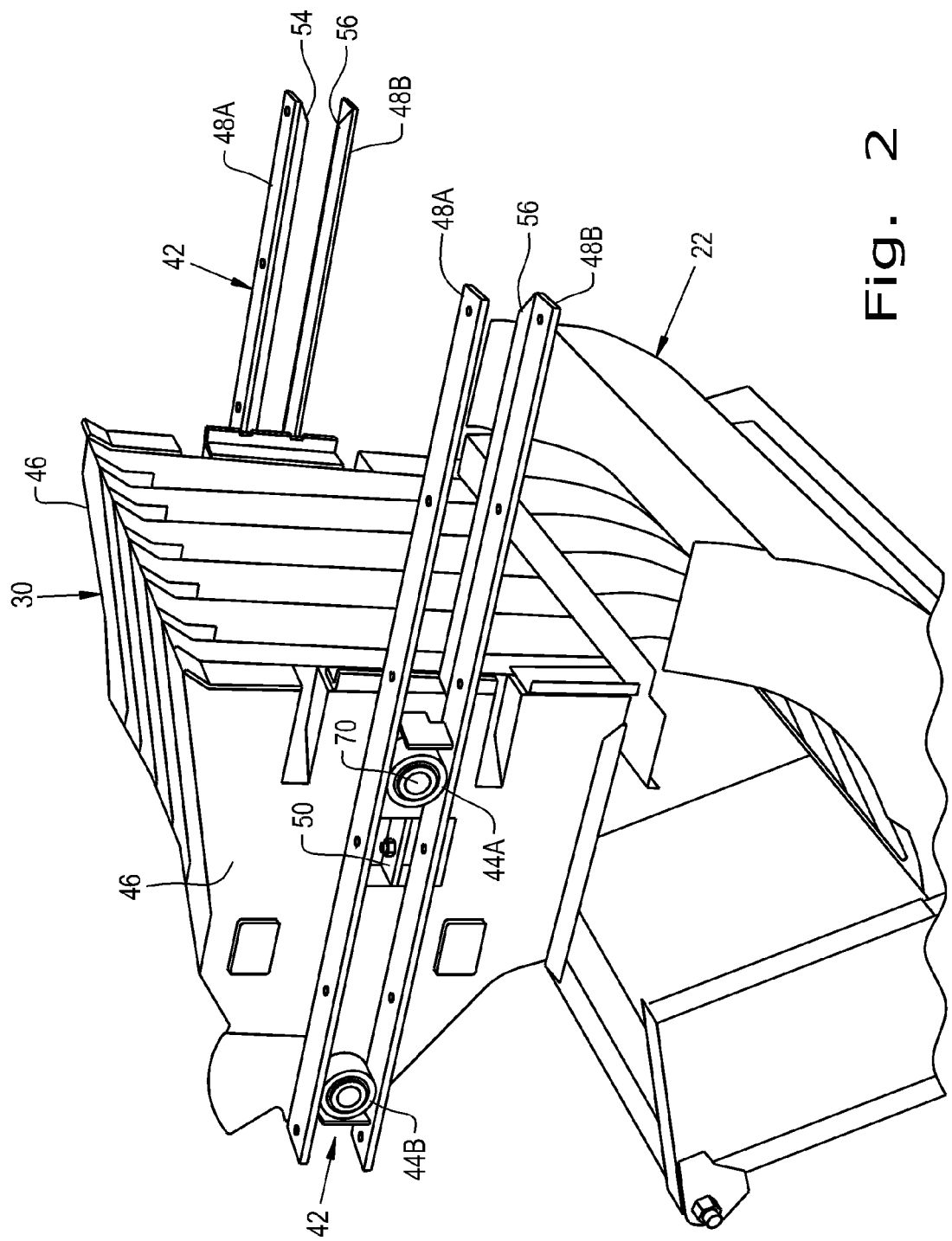
FIG. 2 is a perspective view of a portion of the baler shown in FIG. 1, including the plunger, plunger slot arrangement and pre-compression chamber, with the plunger at a rearward position at the end of return stroke position.
Figure 3:
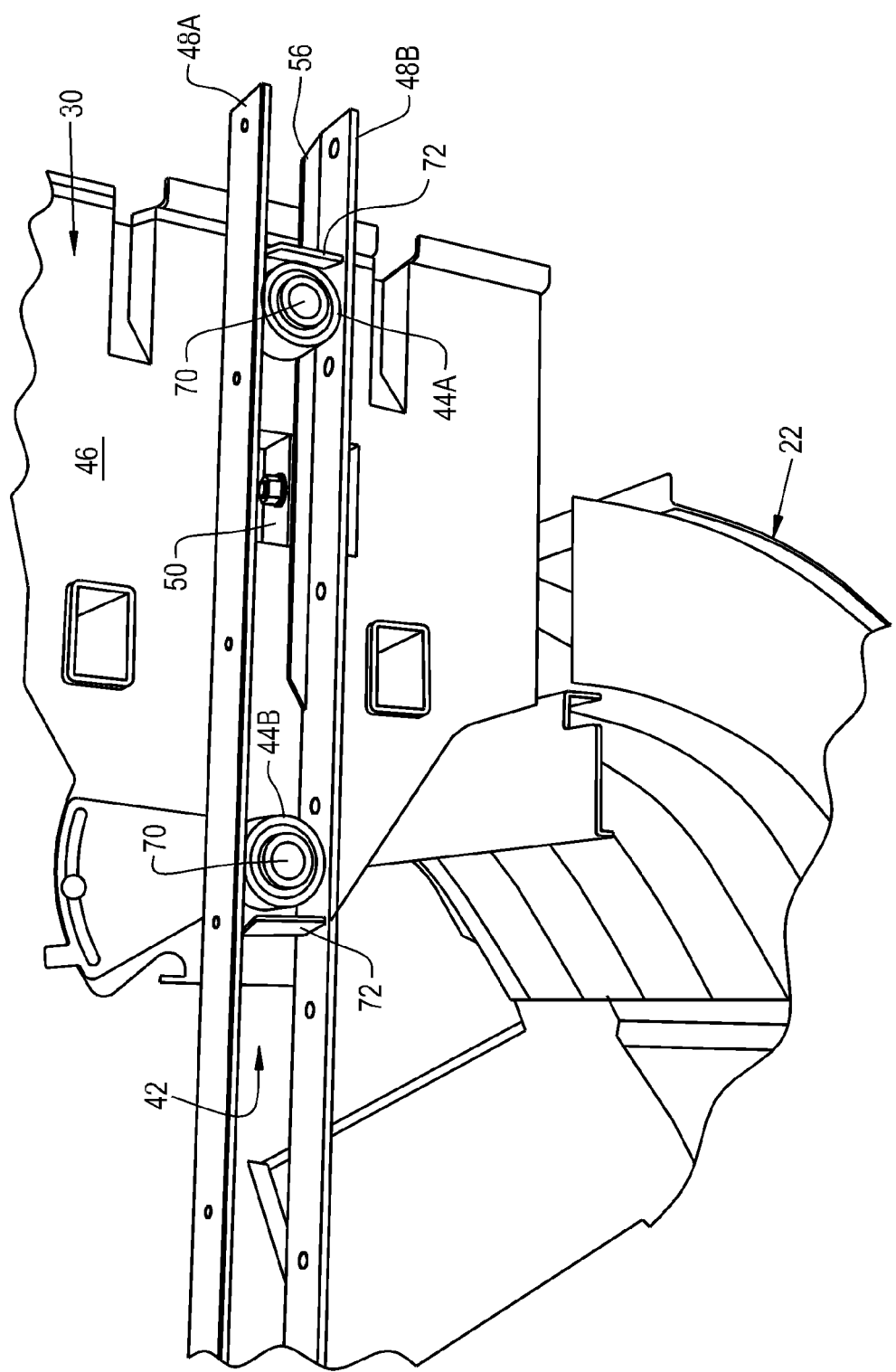
FIG. 3 is another perspective view of a portion of the baler shown in FIG. 1, including the plunger, plunger slot arrangement and pre-compression chamber, with the plunger at a forward position at the end of compression stroke position.

More specifically, the plunger 30 travels between a rearward position when at the end of a return stroke (as shown in FIG. 2) and a forward position when at the end of a compression stroke (as shown in FIG. 3). When the plunger 30 is at the rearward position, the exit of the pre-compression chamber 22 is open as shown in FIG. 2, and the front face of the plunger 30 is positioned to the rearward side of the exit of the pre-compression chamber, so that the pre-compressed crop material can be transferred into the main bale chamber 26. Since this is the rearward most position of the plunger 30, then the upper cover 54 and lower cover 56 need only extend over the portion of the main bale chamber 26 that is exposed to the crop material (i.e., the portion that is forward of the front face of the plunger 30 in FIG. 2). In the illustrated embodiment, the upper cover 54 and lower cover 56 extend over an approximate forward half of the plunger slot 42. However, the exact length of the upper cover 54 and lower cover 56 can vary, depending on the specific configuration of the main bale chamber.

Referring now to FIGS. 4-7, the upper cover 54 is connected to a bottom surface 66 at the laterally inside edge 58 of the top rail 48A. The upper cover 54 is constructed as a metal plate in the illustrated embodiment and is welded to the top rail 48A. However, the upper cover 54 can be attached by other suitable attachment techniques, such as by using fasteners (e.g., screws) or an adhesive. The upper cover 54 can also be formed from other suitable materials, such as plastic or fiberglass. Further, the upper cover 54 can be attached to the laterally inside vertical edge of the top rail 48A, or even possibly attached to the side wall 46 within the main bale chamber 26.

The lower cover 56 is connected to a top surface 68 at the laterally inside edge 62 of the bottom rail 48B. The lower cover 56 is constructed as a metal plate in the illustrated embodiment and is welded to the bottom rail 48B. However, the lower cover 56 can be attached by other suitable attachment techniques, such as by using fasteners (e.g., screws) or an adhesive. The lower cover 56 can also be formed from other suitable materials, such as plastic, fiberglass or rubber. Further, the lower cover 56 can be attached to the laterally inside vertical edge of the bottom rail 48B.

Figure 4:
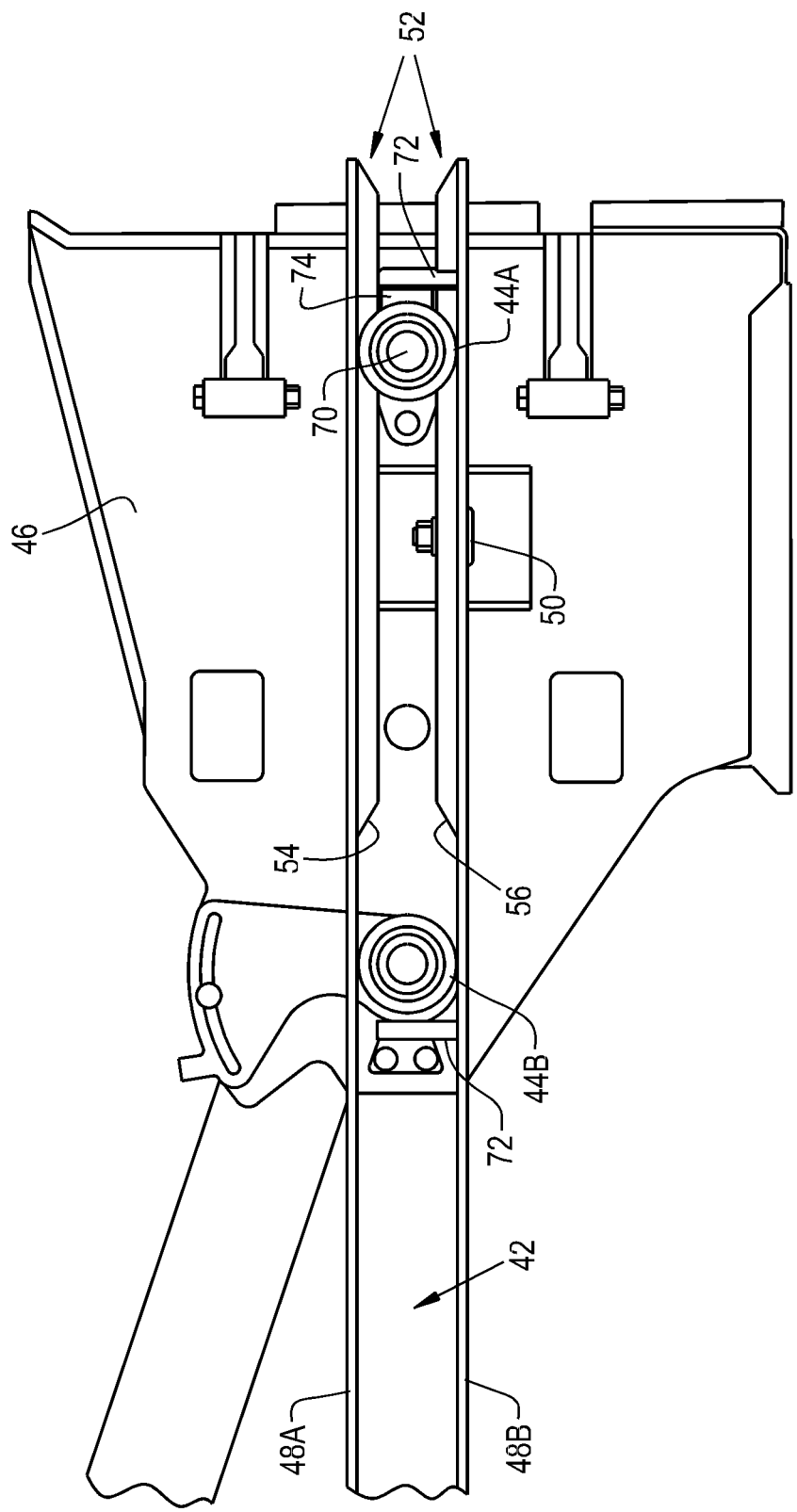
FIG. 4 is a side view showing the plunger and plunger slot arrangement, with the plunger at the end of compression stroke position.
Figure 5:
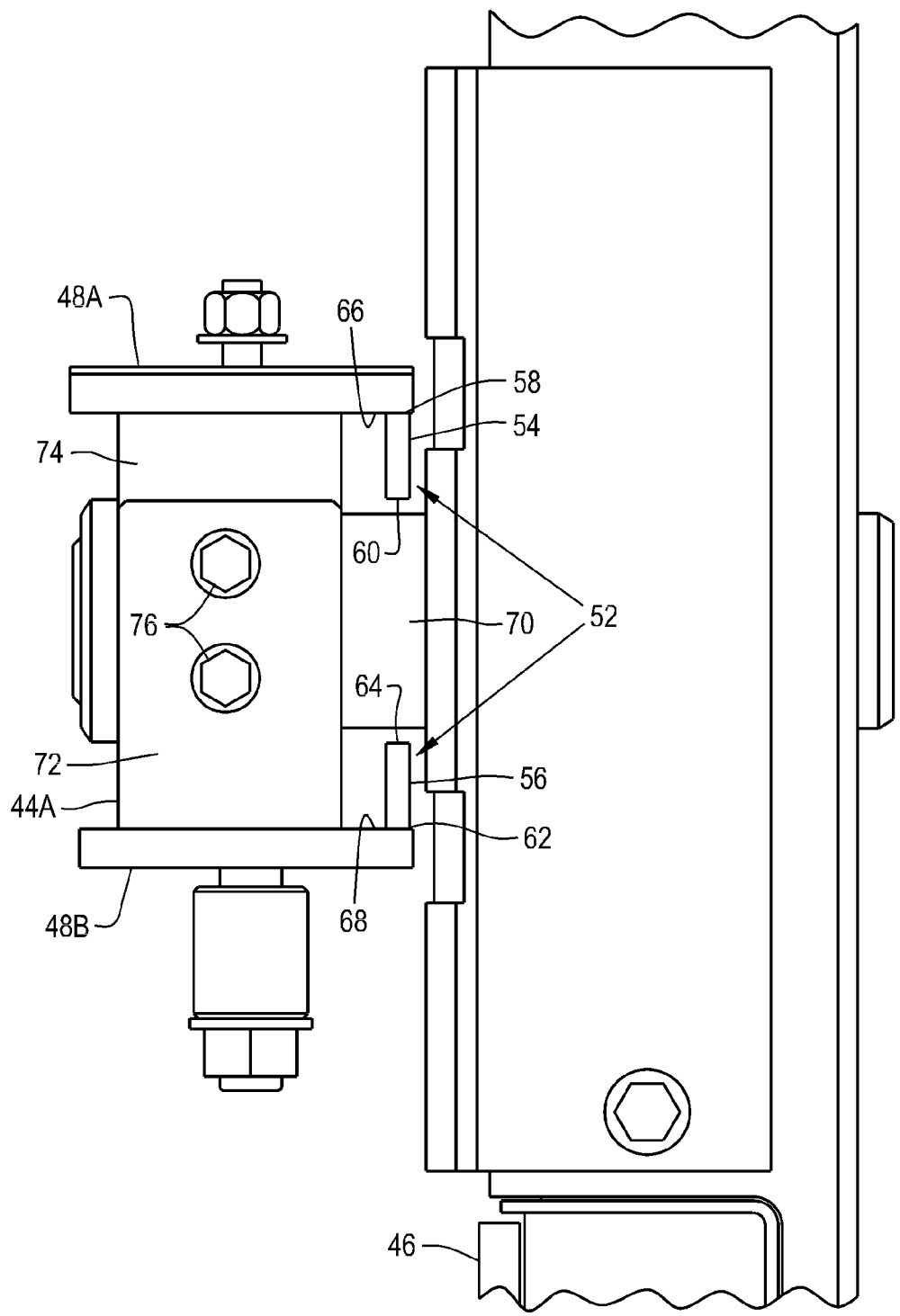
FIG. 5 is an end view of the plunger slot arrangement and a portion of the plunger, as viewed from the right side of FIG. 4.

As best seen in FIGS. 4 and 5, as the plunger 30 travels forward during a compression stroke, the forward roller 44A is positioned between the top and bottom rails 48A and 48B. The upper cover 54 and lower cover 56 are each positioned between the forward roller 44A and the plunger 30 (see FIG. 5). The forward roller 44A is rotatably mounted to a roller shaft 70, which in turn is mounted to and extends from the side 46 of the plunger 30. The lower edge 60 of the upper cover 54 and the upper edge 64 of the lower cover 56 lie closely adjacent to the roller shaft 70 when the forward roller 44a is between the top and bottom rails 48A and 48B. The clearance distance between the roller shaft 70 and the top and bottom rails 48A and 48B is sufficient to inhibit contact therebetween, while at the same time keeping the distance between the rails 48A and 48B to a minimum to inhibit crop from entering the plunger slot 42.

The plunger slot arrangement can be provided with two pairs of optional scrapers 72 which further assist with inhibiting a buildup of crop material within plunger slot 42. In the illustrated embodiment, the scrapers 72 associated with each plunger slot 42 are in the form of flat plates, with one plate located to the front side of the forward roller 44A and the other plate located to the rear of the rearward roller 44B. A number of brackets 74 are attached to the side 46 of plunger 30, and each scraper 72 is bolted to a respective bracket 74 in a vertically adjustable manner using bolts 76. Each scraper 72 can be positioned such that the bottom edge of the scraper 72 lies against or closely adjacent to the bottom rail 48B, and in this manner removes crop material from the bottom of plunger slot 42 as the plunger 30 reciprocates within the main bale chamber 26. The scrapers 72 shown in FIGS. 2-5 are just one example of a scraper which effectively removes crop material from plunger slot 42, and it will be appreciated that other configurations for the scrapers are also possible.

During operation of baler 10, plunger 30 reciprocates back and forth during compression strokes within the main bale chamber 26. As the plunger 30 reciprocates back and forth, the rollers 44A and 44B likewise reciprocate back and forth within a respective plunger slot 42. The movement of the rollers 44 causes a movement of air within the plunger slot 42 which acts to blow out or remove the crop material from the plunger slot 42. The upper cover 54 and lower cover 56 are positioned in the forward portion of the plunger slot 42, and are exposed to crop material within the main bale chamber 26. The spacing between the upper cover 54 and lower cover 56 is such that the roller shaft 70 can pass therebetween during movement of the plunger 30, while retaining a minimum distance to inhibit crop from entering the plunger slot 42. The optional scrapers 72 also mechanically remove crop from within plunger slot 42, and further cause air movement within the plunger slot 42 for removal of the crop material.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
a main bale chamber including a pair of opposed side walls, each said side wall including a plunger slot arrangement defining a plunger slot;
a pair of plunger slot rails positioned in each plunger slot, including a top rail positioned at a top of the respective plunger slot and a bottom rail positioned at a bottom of the respective plunger slot; and
a plunger reciprocally disposed within said main bale chamber, said plunger including a pair of opposed sides and at least one roller extending laterally outward from each said side, each said roller being positioned within a respective said plunger slot;
a pair of plunger slot cover assemblies, each said cover assembly being associated with a respective said plunger slot and having an upper cover and a lower cover, said upper cover extending downward from the top rail and having a lower edge positioned between at least one respective said roller and the plunger when the plunger is at a forward position, said lower cover extending upward from the bottom rail and having an upper edge positioned between at least one respective said roller and the plunger when the plunger is at the forward position; and
a plurality of scrapers, each said scraper being associated with a respective said roller and positioned within a corresponding said plunger slot.

2. The agricultural baler of claim 1, wherein each said upper cover is connected to a laterally inside edge of a corresponding said top rail, and each said lower cover is connected to a laterally inside edge of a corresponding said bottom rail.

3. The agricultural baler of claim 2, wherein each said upper cover and each said lower cover are positioned in an approximate forward half of the plunger slot.

4. The agricultural baler of claim 2, wherein each said upper cover and each said lower cover are positioned in an area forward of the plunger when the plunger is at a rearward position.

5. The agricultural baler of claim 2, wherein only a single roller is positioned between a corresponding said upper cover and said lower cover when the plunger is at a forward position.

6. The agricultural baler of claim 2, wherein the plunger includes a plurality of roller shafts, with each said roller shaft carrying a corresponding said roller, and wherein the lower edge of each said upper cover and the upper edge of each said lower cover lie closely adjacent to at least one said roller shaft when the plunger is at a forward position.

7. The agricultural baler of claim 1, wherein each said upper cover and each said lower cover are plates, each said upper cover being connected to a corresponding said top rail, each said lower cover being connected to a corresponding said bottom rail.

8. The agricultural baler of claim 7, wherein each said upper cover is connected to a bottom surface of a corresponding said top rail, and each said lower cover is connected to a top surface of a corresponding said bottom rail.

9. The agricultural baler of claim 7, wherein each said upper cover and each said lower cover are connected to a corresponding said top rail or bottom rail by welding, adhesive bonding, or fasteners.

10. The agricultural baler of claim 7, wherein each said upper cover and lower cover is a plate formed from metal, plastic, fiberglass or rubber.

11. The agricultural baler of claim 1, wherein the plunger includes two pairs of rollers, with each pair of rollers being located on a respective side of the plunger, and wherein the plurality of scrapers include at least one scraper located on a respective said side of the plunger, and each said scraper is located to the front of a respective forward roller or the rear of a respective rearward roller.

12. The agricultural baler of claim 11, wherein the plurality of scrapers include two pairs of scrapers with each pair of scrapers being located on respective sides of the plunger, and each pair of scrapers having one scraper located to the front of a respective forward roller and one scraper located to the rear of a respective rearward roller.

13. The agricultural baler of claim 1, wherein each said scraper is operable to remove crop material from within a respective said plunger slot during reciprocating movement of said plunger within said main bale chamber.

14. The agricultural baler of claim 1, wherein the baler is a large square baler.

* * * * *